No. 732,485. PATENTED JUNE 30, 1903.
W. N. WIGHT.
COMPOSITE COLUMN AND BEAM.
APPLICATION FILED JAN. 30, 1903.
NO MODEL. 2 SHEETS—SHEET 1.

WITNESSES:
Fred White
Thomas Wallace

INVENTOR:
William N. Wight,

By Attorneys,

No. 732,485. PATENTED JUNE 30, 1903.
W. N. WIGHT.
COMPOSITE COLUMN AND BEAM.
APPLICATION FILED JAN. 30, 1903.
NO MODEL. 2 SHEETS—SHEET 2.

WITNESSES:

INVENTOR:
William N. Wight,
By Attorneys,

No. 732,485.

Patented June 30, 1903.

UNITED STATES PATENT OFFICE.

WILLIAM N. WIGHT, OF NEW YORK, N. Y.

COMPOSITE COLUMN AND BEAM.

SPECIFICATION forming part of Letters Patent No. 732,485, dated June 30, 1903.

Application filed January 30, 1903. Serial No. 141,099. (No model.)

*To all whom it may concern:*

Be it known that I, WILLIAM N. WIGHT, a citizen of the United States, residing in the borough of Manhattan, city, county, and State of New York, have invented certain new and useful Improvements in Composite Columns and Beams, of which the following is a specification.

My invention aims to provide certain improvements in columns and beams or girders made of concrete and metal combined, so as to utilize to the best advantages the strength and fire-resisting qualities of each.

According to one feature of my invention I provide a metal core and surround and embed the same with concrete to stiffen it against buckling and protect it from heat, and I embed in the concrete a fabric, such as wire-netting, which reinforces the concrete and also prevents disintegration thereof by heat. The fabric should be near the outer face of the concrete to most effectively prevent disintegration. The fabric is preferably of fine wires and large mesh, so that it retains but little heat and is subjected to very little warping strain, thus avoiding the contortion which with heavier metal would assist in destroying the concrete rather than preserving it in case of fire. The concrete being thus well preserved, in turn insulates the core of heavier metal and prevents the access thereto of enough heat to distort it. Preferably the metal core has interspaces between some or all of its parts, and these spaces are filled with concrete, which stiffen the structure and its several parts against buckling strains. I thus utilize the concrete to resist the transverse buckling strains, which as long as the column is held perfectly straight and the load axial are comparatively slight, and I depend on the metal only to resist the direct compressive strains. By this economical distribution of the materials I am enabled to use comparatively light columns, as far as the metal is concerned, for carrying considerable loads. This improvement also obviates the necessity of latticing or bolting the individual shapes of which a column may be composed, the concrete serving to hold the several shapes in their proper relative positions. By combining the two features—namely, the concrete within the interspaces between the parts of the metal structure and the concrete and wire fabric surrounding the whole—a column is obtained which is most economical in metal compared to its strength and which is safe against practically all fires.

Various other improvements in detail are provided by my invention, which are referred to hereinafter.

Referring to the accompanying drawings, illustrating embodiments of the invention, Figure 1 is a perspective view showing a column in course of construction. Fig. 2 is a cross-section of the column shown in Fig. 1. Figs. 3 to 11, inclusive, are cross-sections showing the system applied to different metal shapes. Fig. 12 is a perspective view of the column shown in Fig. 11 in course of construction. Figs. 13 and 14 are perspective views of portions of beams or girders built on the principle of the columns shown in Figs. 10 and 11. Fig. 15 is a perspective view showing a portion of the fabric of Fig. 1, on an enlarged scale, to show clearly another form of the fabric.

Referring to the embodiments of the invention illustrated, the column or beam may be said to consist of three parts, an internal metal structure or core, designated generically by the letter A and having interspaces between some or all of its parts, which parts are generally separate shapes of rolled iron or steel, such as the channels B and C and the I-beam D of Figs. 1, 2, and 3. Filling the interspaces between the parts of the metal structure is a mass of concrete, as indicated at E, which holds the several parts in position and stiffens each individual part against buckling in the manner above explained. Surrounding the core as a whole is a mass of concrete F, which may be the same material as that employed to fill the interspaces between the parts of the metal structure and which may be given any suitable shape—as, for example, round or square. This concrete is made thick enough to effectively insulate the core from outside heat and also to protect it from rust, as well as to stiffen it against transverse buckling strains, as described. Ordinarily two or three inches of concrete around the central structure will be sufficient. Near the face of the surrounding concrete is embedded a fabric—such, for example, as the wire fabric G. I prefer to use a fabric of fine but extremely strong steel wires and having large meshes, so as to weaken as little as possible the concrete along the lines of the wires, and to embed this fabric at about an inch inside the face of the concrete. The fabric which I preferably use is described in my application, Serial No. 114,868, of July 9, 1902, illustrated in perspective in Figs. 1 and 12, and is formed in long strips of four or five feet width. The longitudinal wires H of the fabric are maintained straight, so that when they are strained they can only yield by tension and not by the straightening out of any bends therein. Preferably also these longitudinal wires are heavier than the cross-wires J, as indicated in Fig. 15, the function of which latter is chiefly to space the longitudinal wires properly and to transmit lesser strains thereto. In forming the fabric the two systems of wires are bound together at their crossing points. Preferably the straight stronger wires of the fabric run around the column to give the greatest assistance to the concrete in resisting buckling strains. By this arrangement of the wires the construction of the column is also easier, only four or five feet of the height of the same being surrounded by netting and ready for application of the concrete at one time.

The outer mass of concrete surrounding the metal core may be even more strongly reinforced by using two or more embedded sheets of fabric. Such a construction is illustrated in Fig. 3. In this case by separating the sheets of fabric from each other and having their strands staggered relatively to each other a double reinforcement of the concrete is obtained without the weakening of the same which would result from a fabric of heavier wires or of more numerous meshes. Where two sheets of fabric are employed, the fabrics may be crossed, the longitudinal wires of one fabric extending around the column and the longitudinal wires of the other extending up and down the column, as illustrated. Where three fabrics are employed, two of them would be arranged with the longitudinal wires running around and the intermediate fabric with its longitudinal wires running up and down the column, or a single fabric might be wound around the column more than once.

The structural metal shapes shown are generally old and well known and are used merely as examples to illustrate the application of the general principle to a number of particular cases. The method of arrangement also is not a necessary part of the broad invention. For example, in Figs. 4 to 11 I show a number of different shapes and a number of arrangements thereof which may be employed in building the column of my invention.

In Fig. 4 the metal supporting structure consists of a pair of steel or iron cylindrical columns K K', concentrically arranged and held in place and stiffened by concrete in the interspace E and filling the central cylinder. The wire fabric G is shown as also cylindrically arranged, and the outer mass of concrete F is shown square. The wire fabric might also be made to run parallel with the plane faces of the concrete F. The thickness and number of the cylindrical members K K' might be varied to obtain any desired cross-sectional area of metal.

Figure 1:
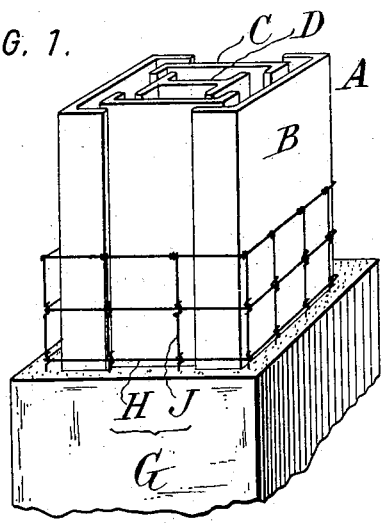
Figure 2:
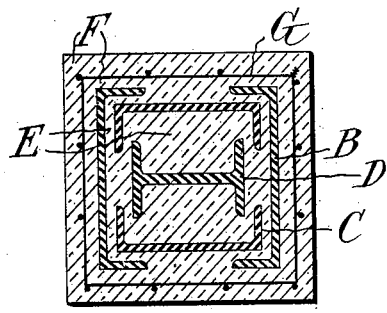
Figure 3:
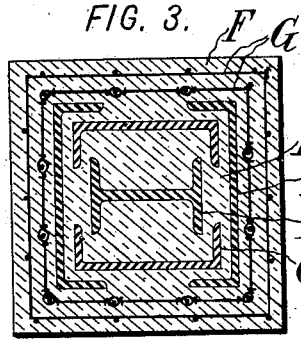
Figure 4:
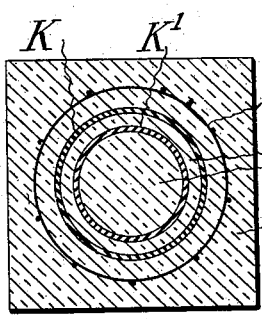
Figure 5:
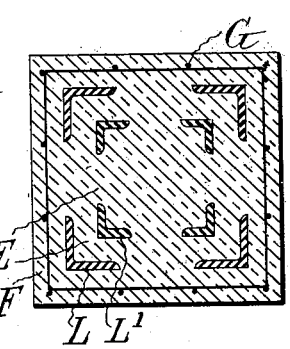
Fig. 5 shows the application of the invention with a series of angle-irons L L', which also might be varied in size and number to obtain any desired cross-sectional area of metal. The interspaces E within the periphery of the core formed by the angles connects with the outer space, so that the concrete in the spaces E and the outer mass of concrete F are substantially a single structure.
Figure 6:
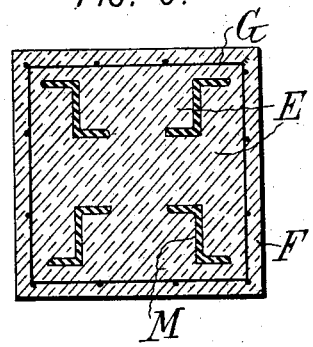
Fig. 6 shows a manner of using Z-bars M. The concrete in the interspaces E within the periphery formed by the Z-bars is in one with the outer mass of concrete F.
Figure 7:
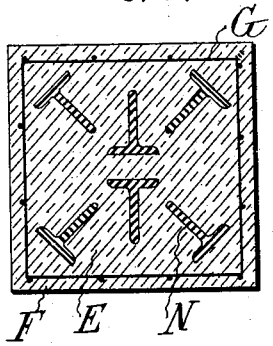
Fig. 7 shows a manner of using T-bars N, the open interspaces E between which result in the concrete in the interspaces and the outer mass of concrete F being substantially integral.
Figure 8:
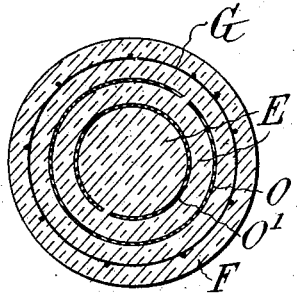

Fig. 8 shows a manner of employing rolled sheet-metal cylinders O O' according to my invention. These may be concentrically arranged, as in the case of the cylinders shown in Fig. 4. I have shown the outer mass F of concrete in this case cylindrical, as well as the fabric G, though these may be varied, as explained in connection with Fig. 4.

Figure 9:
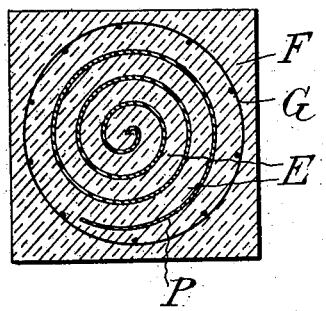

In all the previous structures the metal structure comprises separate metal members, and the inner mass of concrete serves not only to stiffen the metal, but also holds the several separate parts in their proper positions, thus taking the place of the latticing or bolting which are ordinarily employed in making built-up columns. In Fig. 9 I show an example of a metal structure having interspaces between these parts, though these parts are not separate from each other. The concrete in the interspaces, however, serves for stiffening and preserving in proper relative positions the several parts of the metal structure. The example shown consists of a sheet-metal spiral column P, between the successive convolutions of which are interspaces E, some or all of which are filled with concrete, the whole being surrounded by a square outer mass F of concrete reinforced by a cylindrical sheet of fabric G.

Figure 10:
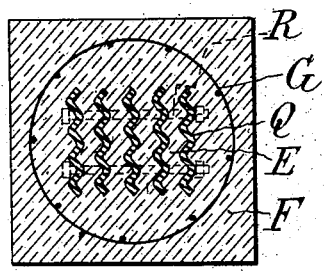

Fig. 10 shows the central metal structure composed of a number of corrugated plates Q, arranged with interspaces E, filled with concrete and surrounded by a square mass F of concrete reinforced by a cylindrical fabric G. In order to support the plates Q in position while the column is being built, any suitable means may be used, such as bolts R, arranged at intervals in the length of the plates.

Figure 11:
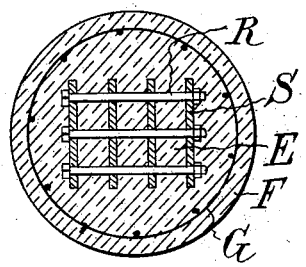

Fig. 11 shows the application of the principle to a metal structure comprising flat plates S, provided with concrete in the interspaces E and with a cylindrical outer mass of concrete F, reinforced by a similar fabric G. In this case also the plates may be properly spaced for the laying of the concrete between and about them by means of bolts R, arranged at suitable intervals.

Figure 12:
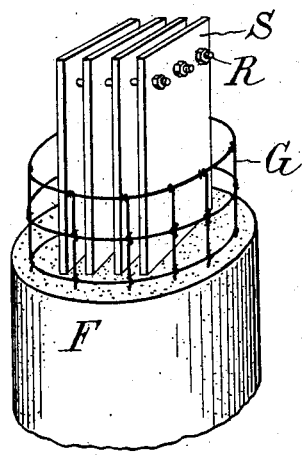

Fig. 12 illustrates in perspective the column of Fig. 11 in course of construction, showing the plates S and the bolts R at the upper end holding the plates in proper position and showing also the projecting end of the fabric G.

The same principles may be applied to the construction of beams, the only difference being in the shape. Columns, being strained equally in all transverse directions, are generally of circular or other regular shape in cross-section, while beams, being strained more in the vertical direction than in the horizontal direction, are of greater depth than width. Examples of beams constructed according to my invention are shown in Figs. 13 and 14.

Figure 13:
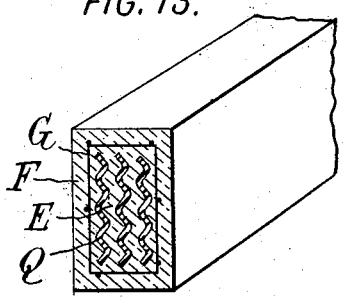
Figure 15:
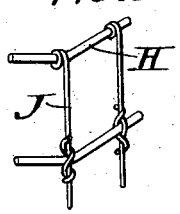

In Fig. 13 I have illustrated the use of the corrugated plates Q of Fig. 10, forming a core with the usual interspaces E and surrounded by a mass F of concrete reinforced by a fabric G, extending parallel to the faces of the beam, the proportions and arrangement of the parts being such as to give a beam of rectangular shape and much greater breadth than depth.

Figure 14:
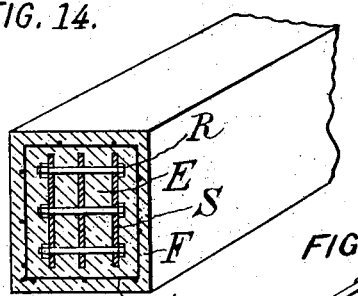

Fig. 14 illustrates the employment of the flat plates S, (shown in Fig. 11,) spaced apart by bolts R to have interspaces E, which are filled with concrete and surrounded by a mass F of concrete reinforced by a fabric G, parallel with the faces of the beam, the parts being arranged to provide a beam of slightly greater depth than width.

Though I have described with great particularity of detail columns and beams embodying my invention, yet it is to be understood that the invention is not limited to any or all the specific structures shown. Various modifications thereof in the details and in the combination and arrangement of the parts are possible to those skilled in the art without departure from the invention.

What I claim is—

1. In a column or beam, in combination, a metal core, concrete surrounding and embedding the same and stiffening it against buckling and protecting it from heat, and a fabric embedded in said concrete outside of said core to prevent disintegration of the concrete and exposure of the core in case of fire.

2. In a column or beam, in combination, a metal core, concrete surrounding and embedding the same and stiffening it against buckling and protecting it from heat, and a fabric embedded in said concrete outside of said core and spaced apart therefrom and near the face of the column to prevent disintegration of the concrete and exposure of the core in case of fire.

3. In a column or beam, in combination, a metal core having interspaces between its parts, concrete surrounding and embedding the core and filling said interspaces thereby stiffening the core and its several parts against buckling and protecting them from heat, and a fabric embedded in said concrete outside of said core to prevent disintegration of the concrete and exposure of the core in case of fire.

4. In a column or beam, in combination, a metal core having interspaces between its parts, concrete surrounding and embedding the core and filling said interspaces thereby stiffening the core and its several parts against buckling and protecting them from heat, and a fabric embedded in said concrete outside of said core and spaced apart therefrom and near the face of the column to prevent disintegration of the concrete and exposure of the core in case of fire.

5. In a column or beam, in combination, a metal core, concrete surrounding the same and stiffening it against buckling and protecting it from heat, and two sheets of reticulated fabric embedded in said concrete spaced apart from each other and having their strands staggered relatively to each other, reinforcing the concrete and preventing disintegration thereof by heat.

6. In a column or beam, in combination, a metal core comprising a plurality of separate metal members, concrete filling interspaces between said members and surrounding the core, thereby stiffening the core and its several members against buckling and protecting them from heat, and two sheets of reticulated fabric embedded in said concrete spaced apart from each other and having their strands staggered relatively to each other, reinforcing the concrete and preventing disintegration thereof by heat.

7. In a column, in combination, a concrete mass, and a wire fabric comprising straight longitudinal wires and cross-wires spacing said longitudinal wires, said fabric being embedded in said concrete, with its straight wires running around the column to reinforce the same against buckling, and said fabric serving also to prevent disintegration of said concrete by heat.

8. In a column, in combination, a concrete mass, and a wire fabric comprising wires of unequal strength, said fabric being embedded in said concrete with its stronger wires running around the column to reinforce the same against buckling, and said fabric serving also to prevent disintegration of said concrete by heat.

In witness whereof I have hereunto signed my name in the presence of two subscribing witnesses.

WILLIAM N. WIGHT.

Witnesses:
DOMINGO A. USINA,
FRED WHITE.